United States Patent [19]
Mizuno et al.

[11] Patent Number: 5,576,968
[45] Date of Patent: Nov. 19, 1996

[54] EMBROIDERY DATA CREATING SYSTEM FOR EMBROIDERY MACHINE

[75] Inventors: Masahiro Mizuno; Masao Futamura; Yukiyoshi Muto, all of Nagoya, Japan

[73] Assignee: Brother Kogyo Kabushiki Kaisha, Nagoya, Japan

[21] Appl. No.: 394,633

[22] Filed: Feb. 27, 1995

[30] Foreign Application Priority Data

May 31, 1994 [JP] Japan .................................. 6-117919

[51] Int. Cl.$^6$ .................................................. C06F 19/00
[52] U.S. Cl. .............................. 364/470.09; 112/470.04; 112/475.19
[58] Field of Search ..................... 364/470, 188, 364/189, 191–193; 112/121.11, 121.12, 80.23, 266.1, 453, 456, 457, 458, 470.04, 470.05, 475.05, 475.19, 102.5

[56] References Cited

U.S. PATENT DOCUMENTS

| | | | |
|---|---|---|---|
| 5,179,520 | 1/1993 | Hayakawa | 364/470 |
| 5,390,126 | 2/1995 | Kongho et al. | 364/470 |
| 5,430,658 | 7/1995 | Divinsky et al. | 364/470 |
| 5,438,520 | 8/1995 | Satoh et al. | 364/470 |

FOREIGN PATENT DOCUMENTS 3-1893  1/1991  Japan .

*Primary Examiner*—Joseph Ruggiero
*Attorney, Agent, or Firm*—Oliff & Berridge

[57] ABSTRACT

An embroidery data creating system capable of creating embroidery data that enables an operator having no knowledge of stitch characteristics to form an embroidered pattern having a beautiful appearance. The operator scans an original picture with an image scanner to obtain image data and coordinates of points defining a closed embroidering region are extracted from the image data. An end point, e.g., the lowermost point among the points specified by the extracted coordinates, is specified, the rightmost point and the leftmost point among the points specified by the extracted coordinates are determined, a stitching direction is determined on the basis of the greatest distance of the distance between the rightmost point and a boundary line passing through the end point and perpendicular to the embroidering direction and the distance between the leftmost point and the boundary line, and embroidery data is created on the basis of the stitching direction and the coordinates of the boundary points.

20 Claims, 12 Drawing Sheets

Fig.5B

| ITEM | INSTRUCTIONS |
|---|---|
| S1 | READ THE ORIGINAL PICTURE |
| S2 | EXTRACT THE COORDINATES OF POINTS ON THE OUTLINE |
| S3 | SPECIFY A START POINT AND AN END POINT |
| S4 | EXTRACT THE RIGHTMOST POINT AND THE LEFTMOST POINT |
| S5 | DETERMINE THE DIFFERENCE LX BETWEEN THE ABSCISSA OF THE END POINT AND THE ABSCISSA OF THE LEFTMOST POINT |
| S6 | DETERMINE THE DIFFERENCE RX BETWEEN THE ABSCISSA OF THE END POINT AND THE ABSCISSA OF THE RIGHTMOST POINT |
| S7 | IS LX GREATER THAN RX ? |
| S8 | SET THE STITCHING DIRECTION TO A DIRECTION A |
| S9 | SET THE STITCHING DIRECTION TO A DIRECTION B |
| S10 | MAKE OUT EMBROIDERY DATA |
| S11 | STORE EMBROIDERY DATA |

Fig.9B

| ITEM | INSTRUCTIONS |
|---|---|
| S21 | READ THE ORIGINAL PICTURE |
| S22 | EXTRACT THE COORDINATES OF POINTS ON THE OUTLINE |
| S23 | SPECIFY A START POINT AND AN END POINT |
| S24 | DETERMINE A BOUNDARY LINE EL PASSING THE END POINT |
| S25 | DETERMINE THE AREA SR OF A RIGHT REGION ON THE RIGHT SIDE OF THE BOUNDARY LINE EL AND THE AREA SL OF A LEFT REGION ON THE LEFT SIDE OF THE BOUNDARY LINE |
| S26 | IS SL GREATER THAN SR ? |
| S27 | SET THE STITCHING DIRECTION TO A DIRECTION A |
| S28 | SET THE STITCHING DIRECTION TO A DIRECTION B |
| S29 | MAKE OUT EMBROIDERY DATA |
| S30 | STORE EMBROIDERY DATA |

1

EMBROIDERY DATA CREATING SYSTEM FOR EMBROIDERY MACHINE

BACKGROUND OF THE INVENTION

1. Field of the Invention

The invention relates to an embroidery data creating system for an embroidery machine, for creating embroidery data for embroidering a closed region with embroidery stitches.

2. Description of the Related Art

An embroidery data creating system employing a microcomputer and capable of creating precision embroidery data in a short time has been provided for the field of industrial embroidery machines. The embroidery data creating system is constructed by connecting an image scanner, a hard disk drive and such to, for example, a general purpose personal computer and is capable of easily creating embroidery data from an original picture of an optional embroidered pattern.

Under recent circumstances where embroidery machine user's tastes are diversified and inclined toward high quality, and the performance of embroidery machines has been improved, comparatively inexpensive, easy-to-use embroidery data creating systems not only enabling household embroidery machines to embroider patterns represented by predetermined embroidery data stored in a storage device, but also enabling embroidering optional, desired patterns have been provided.

However, when forming stitches by an embroidery machine, different embroidering directions bring about different appearances of the stitches. For example, when forming satin stitches, it is known that the stitches look stable and beautiful when the stitches are formed in a stitching direction A and successively along an embroidering direction from the left to the right as shown in FIG. 3 or when the stitches are formed in a stitching direction B and successively along an embroidering direction from the right to the left as shown in FIG. 4. If stitches are formed in the stitching direction B and successively along the embroidering direction from the left to the right, the thread is untwisted and, consequently, the stitches look blurred (unstable) as compared with the appearance of stitches formed successively along the stitching direction A.

However, it requires skilled work to determine embroidery data specifying the stitching sequence and the stitching direction taking the aforesaid characteristics of the appearance of stitches into consideration by means of the conventional embroidery data creating system so that a closed region is covered with beautiful stitches. If it is difficult for a skilled operator to create embroidery data, how much more difficult for ordinary household operators, having no knowledge about the characteristics of stitches, it must be to create embroidery data having a pleasing appearance when stitched.

SUMMARY OF THE INVENTION

An object of the invention is to provide an embroidery data creating system for embroidery machines, capable of enabling operators not having any knowledge about the characteristics of stitches to create easily embroidery data that will form stitches having a pleasing appearance.

With the foregoing object in view, the invention provides an embroidery data creating system for an embroidery machine for embroidering in one of two opposing directions, comprising: embroidering region defining means for defining an embroidering region; end point specifying means for specifying an end point where stitching is to be terminated in the embroidering region defined by the embroidering region defining means; boundary line determining means for determining a boundary line passing the end point specified by the end point specifying means and perpendicular to an embroidering direction; partial embroidering region selecting means for selecting one of partial embroidering regions respectively on the opposite sides of the boundary line determined by the boundary line determining means, having the point remotest from the boundary line and at a distance greater than the distance between the point remotest of the other partial embroidering region and the boundary line; stitching direction determining means for determining a stitching direction along which stitches are to be formed in the whole embroidering region, the stitching direction is suitable for the partial embroidering region selected by the embroidering region selecting means to form stitches in the embroidering direction and embroidery data creating means for creating embroidery data for the whole embroidering region according to the stitching direction determined by the stitching direction determining means.

In the embroidery data creating system thus structured, the end point specifying means specifies an end point where stitching is to be terminated in an embroidering region defined by the embroidering region defining means, and then the boundary line determining means determines a boundary line passing the end point and perpendicular to the embroidering direction. The region selecting means selects the one of the two partial embroidering regions on the opposite sides of the boundary line, having the remotest point from the boundary line that is at a distance from the boundary line greater than the distance between the remotest point of the other partial embroidering region and the boundary line. Then the stitching direction determining means determines, on the basis of an embroidering direction for the selected partial embroidering region, a stitching direction along which stitches are to be formed in the whole embroidering region. Then, the embroidery data creating means creates embroidery data for the whole embroidering region according to the stitching direction determined by the stitching direction determining means.

As is apparent from the foregoing description, the embroidery data creating system of the invention is capable of readily creating embroidery data, for use by an embroidery machine, that will form an embroidered pattern finished with a beautiful appearance even if the operator does not have any knowledge about the characteristics of stitches and that the appearance of stitches is dependent on embroidering direction.

BRIEF DESCRIPTION OF THE DRAWINGS

A preferred embodiment of the invention will be describe in detail with reference to the following figures whiten:

FIG. 5B is a table of detailed labels for FIG. 5A;

FIG. 9B is a table of detailed labels for FIG. 9A;

DETAILED DESCRIPTION OF THE PREFERRED EMBODIMENTS

Figure 3:
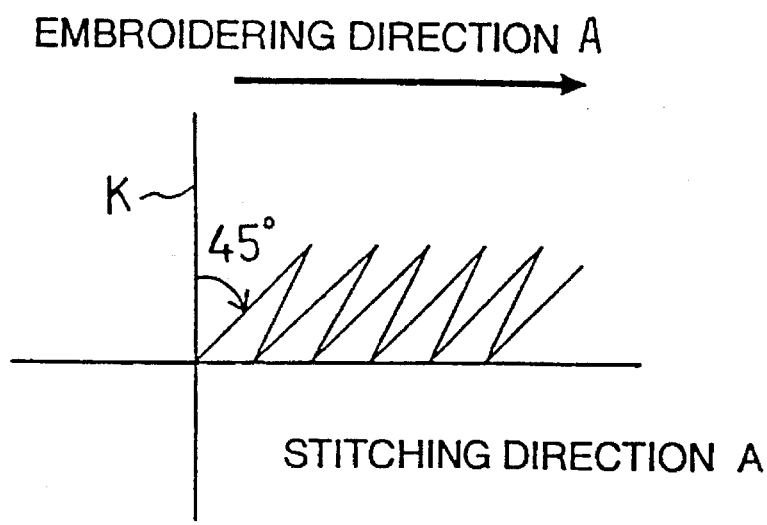
FIG. 3 is a diagrammatic view of assistance in explaining the characteristics of stitches.
Figure 4:
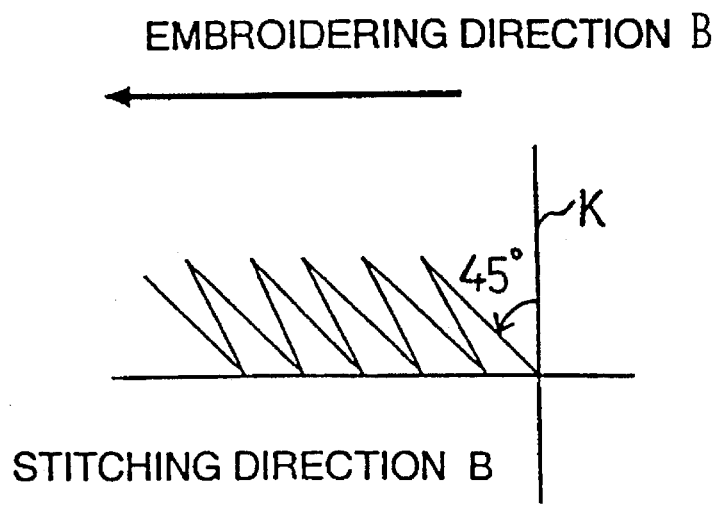
FIG. 4 is a diagrammatic view of assistance in explaining the characteristics of stitches.

A household embroidery machine, not shown, will be described briefly prior to the description of the invention. The embroidery machine moves an embroidery frame, placed on its bed and holding a workpiece, to a desired position on an x-y coordinate system by a horizontal moving mechanism peculiar to the embroidery machine, and operates a needle and a rotary hook mechanism for stitching to embroider a predetermined pattern on the workpiece. In this household embroidery machine, stitches having a beautiful appearance can be formed when the stitches are formed successively along an embroidering direction from the left to the right and the stitches are inclined clockwise at an angle of 45° to a boundary line EL (FIG. 7) perpendicular to the embroidering direction, as shown in FIG. 3 (where line K equates to boundary line EL), or when the stitches are formed successively along an embroidering direction from the right to the left and the stitches are inclined counterclockwise at an angle of 45° to the boundary line EL perpendicular to the embroidering direction, as shown in FIG. 4 (where line K equates to boundary line EL).

When embroidering a pattern, the horizontal moving mechanism and the needle bar are controlled by a controller comprising a microcomputer or the like, and the controller controls the embroidery machine automatically for the embroidering operation according to embroidery data specifying the x- and the y-component of movement of the workpiece for each stitch, i.e., data specifying a stitching point. The embroidery machine is provided with a flash memory device capable of reading external embroidery data from a flash memory card, which will be described later. An embroidery data creating system, which will be described below, is capable of creating embroidery data to be feed to such a flash memory device. The embroidery machine is provided with a display unit for displaying various messages to give instructions including an instruction for the operator to change the color yarns.

An embroidery data creating system embodying the invention will be described hereinafter with reference to FIGS. 1 to 7, as applied to a household embroidery machine. The household embroidery machine is capable of forming embroidery stitches only in the embroidering directions shown in FIGS. 3 or 4, that is, from left to right or right to left. Accordingly, the embroidery data creating system in this embodiment takes into consideration only the embroidering directions shown in FIGS. 3 or 4, namely, the directions parallel to the x-axis.

Figure 1:
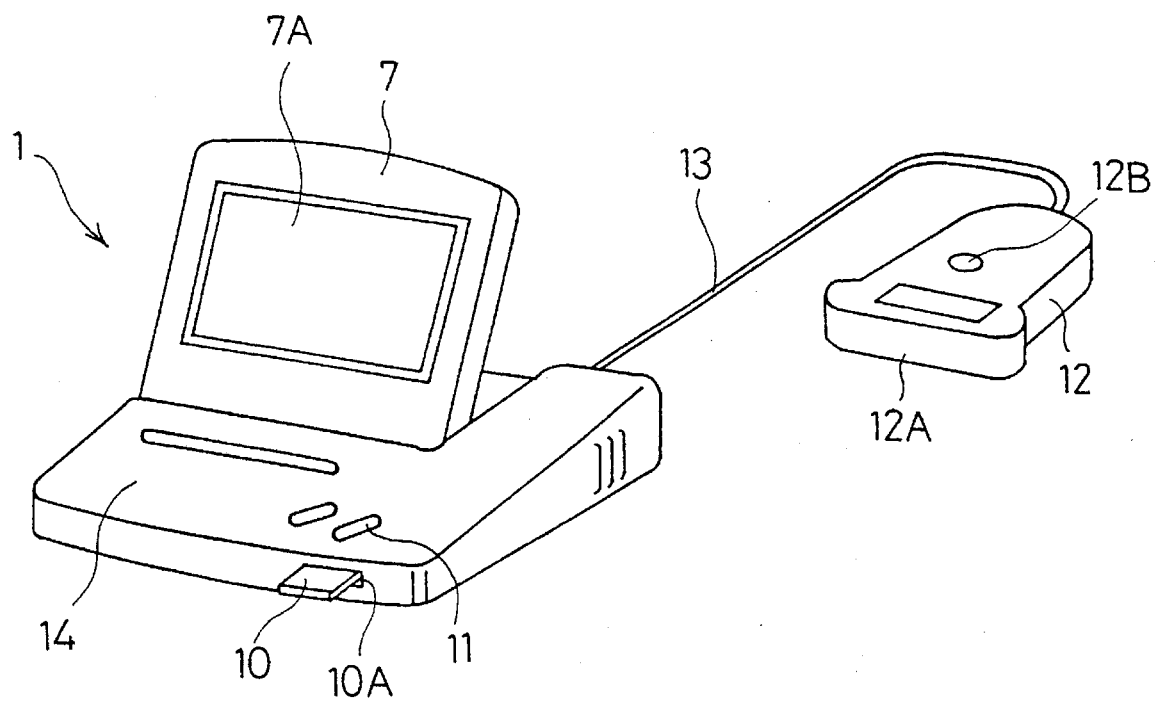
FIG. 1 is a perspective view of an embroidery data creating system in a preferred embodiment according to the invention

Referring to FIG. 1, the embroidery data creating system comprises a main unit 1 and an image scanner 12 connected to the main unit 1 by a cable 13 containing a bundle of signal lines. The image scanner 12 is an image reading device for reading an original picture of an embroidered pattern, i.e., pattern image data. The operator holds the image scanner 12 at its upper part, sets the lower read part 12A to an original picture and moves the image scanner 12 in a direction along the original picture with a button 12B depressed to read the original picture into a raster mode digital pattern image data as an embroidery image. The embroidery image obtained by the image scanner 12 is represented by pixels having a density value of 0 or 1. The embroidery data is transferred through the cable 13 to the main unit 1.

The main unit 1 comprises a liquid crystal display (LCD) 7 and a panel 14 disposed in front of the liquid crystal display 7. The liquid crystal display 7 is joined pivotally to the panel 14. The liquid crystal display 7 has a rectangular screen 7A on which various pieces of information are displayed. Control keys 11 are arranged on the upper surface of the panel 14. Instructions are given by operating the control keys 11 to make the embroidery data creating system carry out its functions. A card slot 10A for receiving a flash memory card 10 is formed in the right portion of the front surface of the panel 14. The flash memory card 10 is a storage medium for storing embroidery data. The embroidery image read by the image scanner 12 and transferred to the main unit 1 is stored temporarily in a RAM 4 included in the main unit 1, an embroidering direction and the like are determined according to an embroidery data creating program, and then the embroidering direction and the like are edited to provide embroidery data. The edited embroidery data is stored in the flash memory card 10, i.e., a flash recording medium formed in a card.

Figure 2:
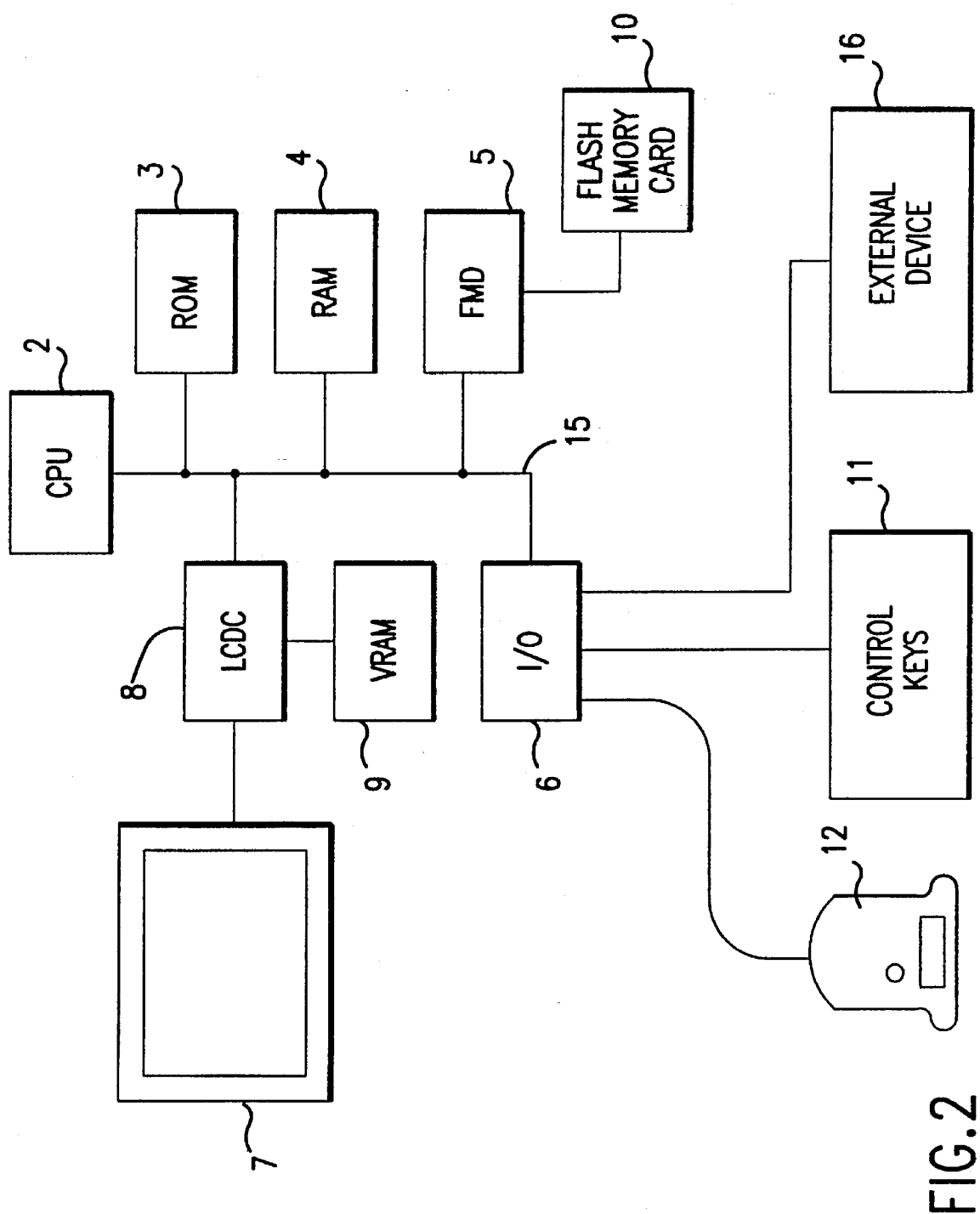
FIG. 2 is a block diagram of the electrical configuration of the embroidery data creating system of FIG. 1.

FIG. 2 shows the electrical configuration of the embroidery data creating system. The electrical system of the embroidery data creating system comprises a CPU 2, a ROM 3, the RAM 4, a flash memory device (FMD) 5, an input/output interface (I/O) 6, a LCD controller (LCDC) 8, and a bus line 15 interconnecting the components.

Programs including the embroidery data creating program, which will be described later, are stored in the ROM 3. The CPU 2 executes control operations according to the programs stored in the ROM 3. The RAM 4 is provided with a work memory for storing data necessary for the control operation of the CPU 2 and a data memory for storing the embroidery data.

The flash memory card 10 is removably loaded into the flash memory device 5. The flash memory device 5 is controlled by the CPU 2 for operations to initialize the flash memory card 10, to write the embroidery data in the flash memory card 10 and to read the embroidery data from the flash memory card 10. The liquid crystal display 7 and a video RAM (VRAM) 9 are connected to the LCD controller 8. The LCD controller 8 controls the liquid crystal display 7 to display the data stored in the video RAM 9 on the screen 7A. The control keys 11 and the image scanner 12 are connected through the input/output interface 6 to the CPU 2 to feed key data entered by the operator and the embroidery image to the CPU 2. An external device 16, such as a sewing machine, can also be connected to the input/output interface 6 for using the embroidery data created by the embroidery data creating device. An external device 16, such as a personal computer, can also be connected to the input/output interface 6 for providing an embroidery image created by the personal computer to the embroidery data creating system.

The operation of the embroidery data creating system thus structured will be described with reference to FIGS. 5A and 5B.

Figure 5A:
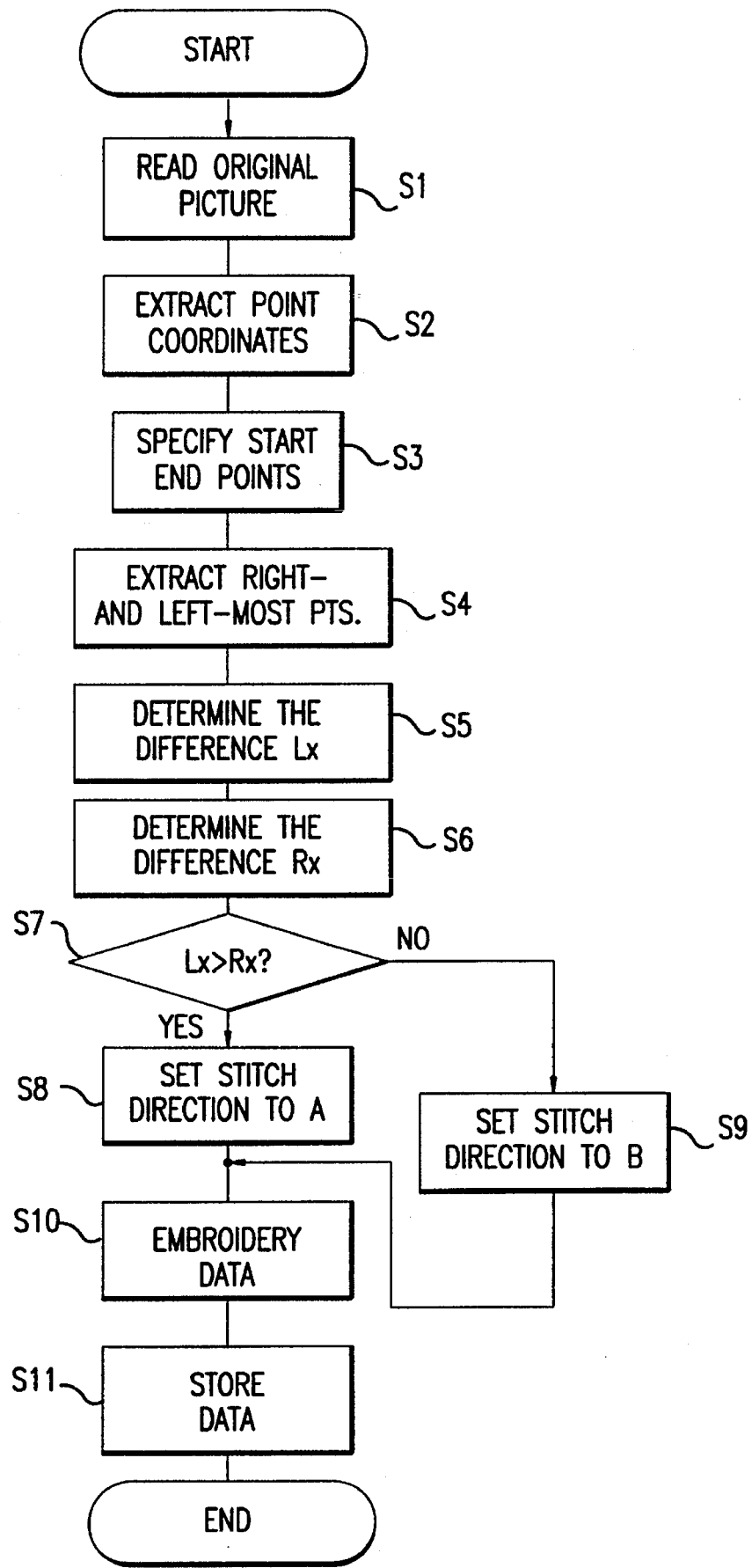
FIG. 5A is a flow chart, with summary labels, of an embroidery data creating procedures to be carried out by the embroidery data creating system of FIG. 1.
Figure 6:
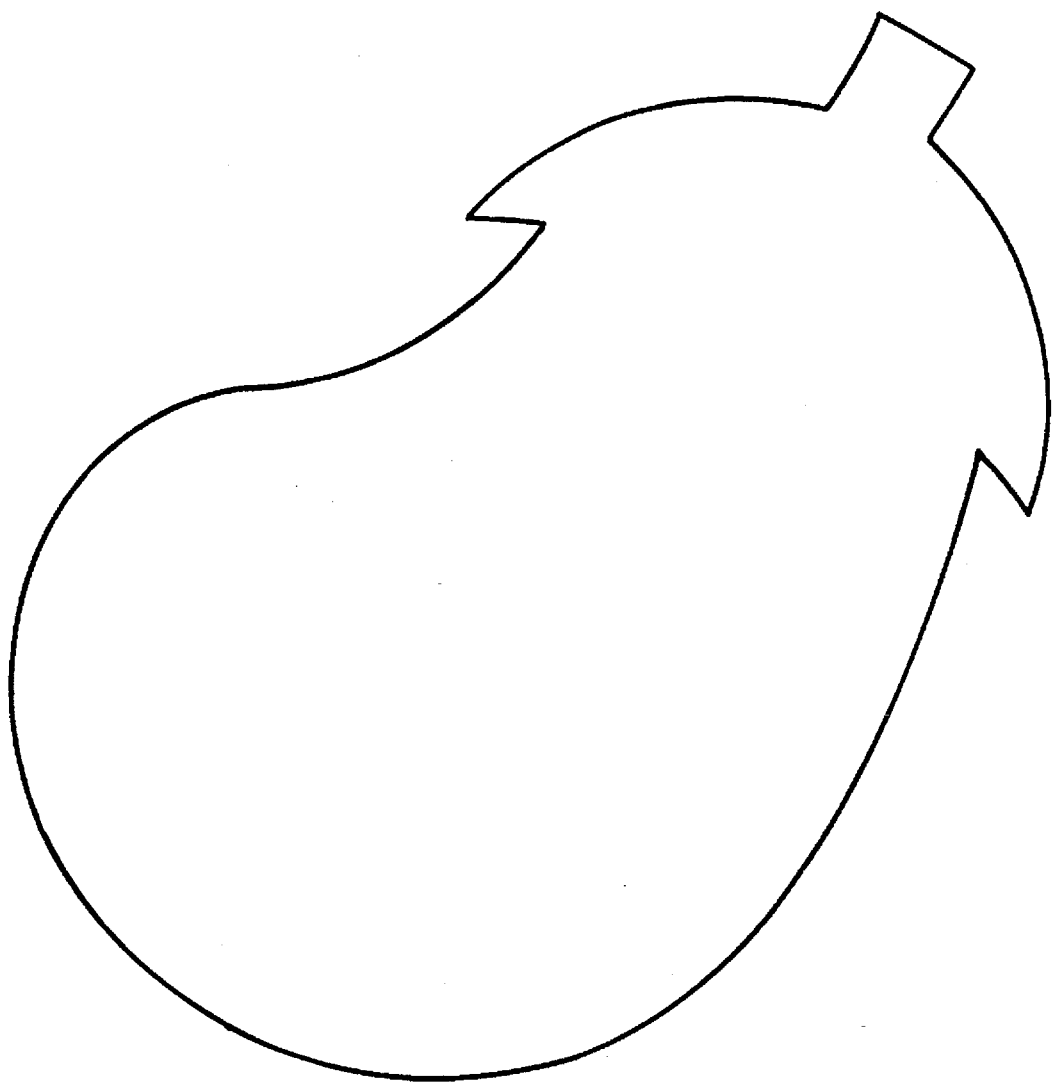
FIG. 6 is an illustration of an original picture of an embroidered pattern.
Figure 7:
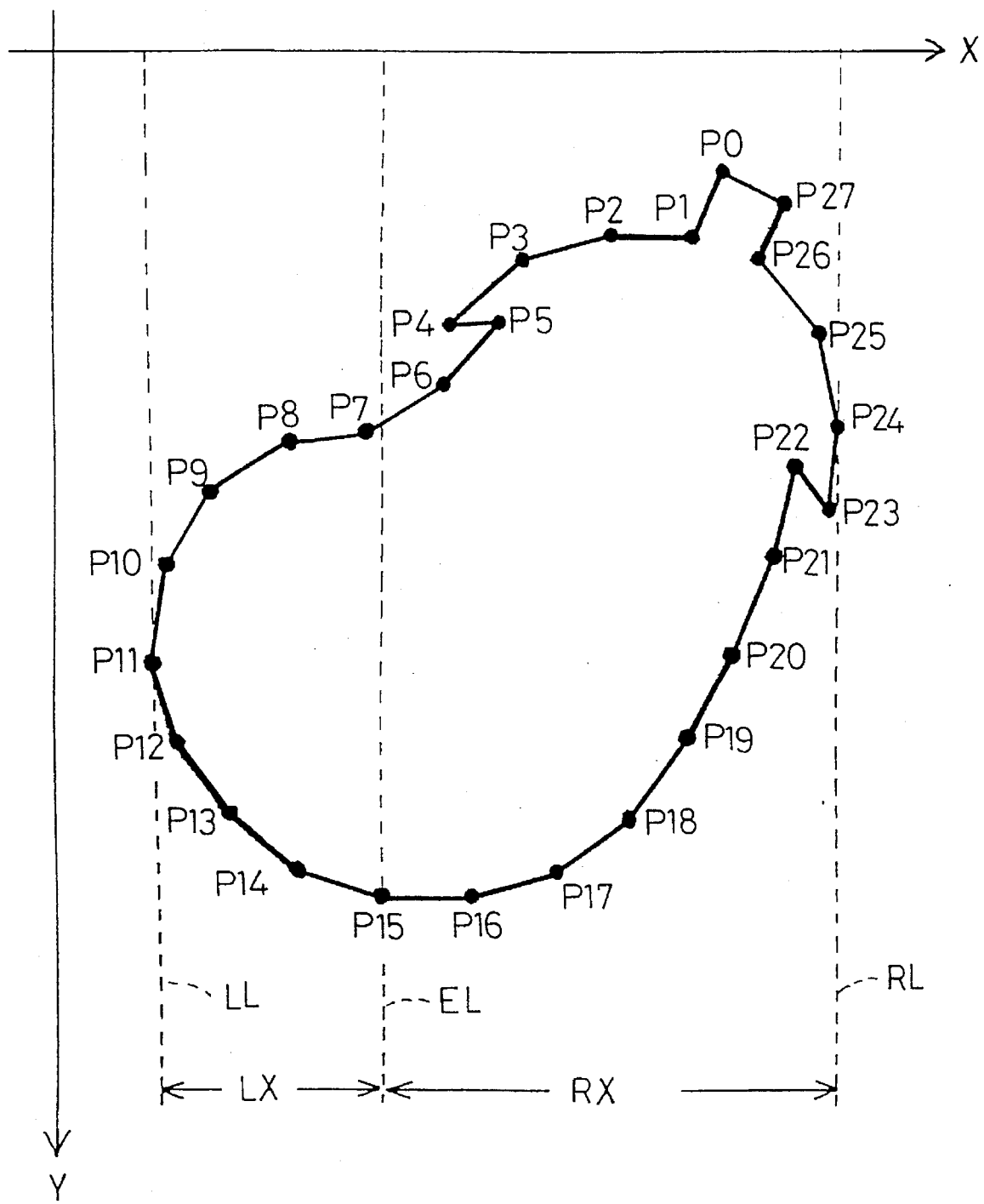
FIG. 7 is a graph showing the coordinates of points, defining a closed region.

The main unit 1 is connected to a power source, and the embroidery data creating program stored in the ROM 3 is started to carry out the procedure shown in FIG. 5A. In step S1, the operator operates the image scanner 12 to read an original picture shown in FIG. 6, a picture of an egg plant, and image data, i.e., an embroidery image, representing the original picture is stored in the RAM 4. In step S2, the coordinates of points that define the outline of a closed region are extracted, that is, the coordinates of points P0 to P27 defining a closed region to be covered with stitches, as shown in FIG. 7, are determined.

In step S3, a start point from which embroidering is started and an end point at which embroidering is terminated are specified. In this embodiment, the start point and the end point coincide with each other because crossover threads, i.e., threads between the end point in a pattern and the start point in the next pattern, extending from the start point and the end point can be simultaneously cut after the completion of embroidering when the start point and the end point coincide with each other or are close to each other. Thus, in step S3, the lowest point P15 with respect to the direction of the y-axis, perpendicular to the x-axis which is parallel to the embroidering direction, among the points defined by the coordinates extracted in step S2 is selected as the start point and the end point according to the embroidery data creating program stored in the ROM 3. A straight line EL passing through the point P15, specified as the end point, and perpendicular to the x-axis is a boundary line.

In step S4, the leftmost point and the rightmost point, i.e., the point remotest from the boundary line EL with respect to directions parallel to the x-axis, are extracted. In this case, the point P11 is the leftmost point and the point P24 is the rightmost point as shown in FIG. 7. In step S5, the difference LX between the respective x-coordinates of the end point P15 and the leftmost point P11 is calculated. The difference LX is the distance between the boundary line EL to the remotest point in an initial partial embroidering region on the left side of the boundary line EL. In step S6, the difference RX between the respective x-coordinates of the end point P15 and the rightmost point P24 is calculated. The difference RX is the distance between the boundary line EL to the remotest point in a region on the right side of the boundary line EL.

In step S7, the differences LX and RX are compared. If the difference LX is greater than the difference RX, the decision in step S7 is affirmative and then step S8 is executed to select a stitching direction A, shown in FIG. 3. If the difference LX is not greater than the difference RX, the decision in step S7 is negative and step S9 is executed to select a stitching direction B, shown in FIG. 4. In this case, the difference LX is smaller than the difference RX as shown in FIG. 7, so the decision in step S7 is negative and the stitching direction B, shown in FIG. 4, is selected in step S9.

Since the operations in steps S4 to S9 select a stitching direction, in which stitches are to be formed in the whole closed region, suitable for an embroidering direction for a partial embroidering region in which long stitches are formed, stitches of a beautiful appearance are formed in most parts of the closed region. In FIG. 7, the boundary line EL, a broken line LL passing the leftmost point P11, and the broken line RL passing the rightmost point P24 are parallel to the y-axis.

After the stitching direction has been determined, embroidery data is created in step S10. The embroidery data is created by first setting a line NL through the lowest point P15 that has the slant appropriate to the selected stitching direction. In this example, that is the stitching direction B, shown in FIG. 4. The furthest point from the lowest, or end, point P15 and on the right side (FIG. 8) of the line NL is then determined. That point is the point P27 and data is prepared for a running stitch from the end point P15 to the point P27. The system then creates the embroidery data between the point P27 and the end point P15.

Figure 8:
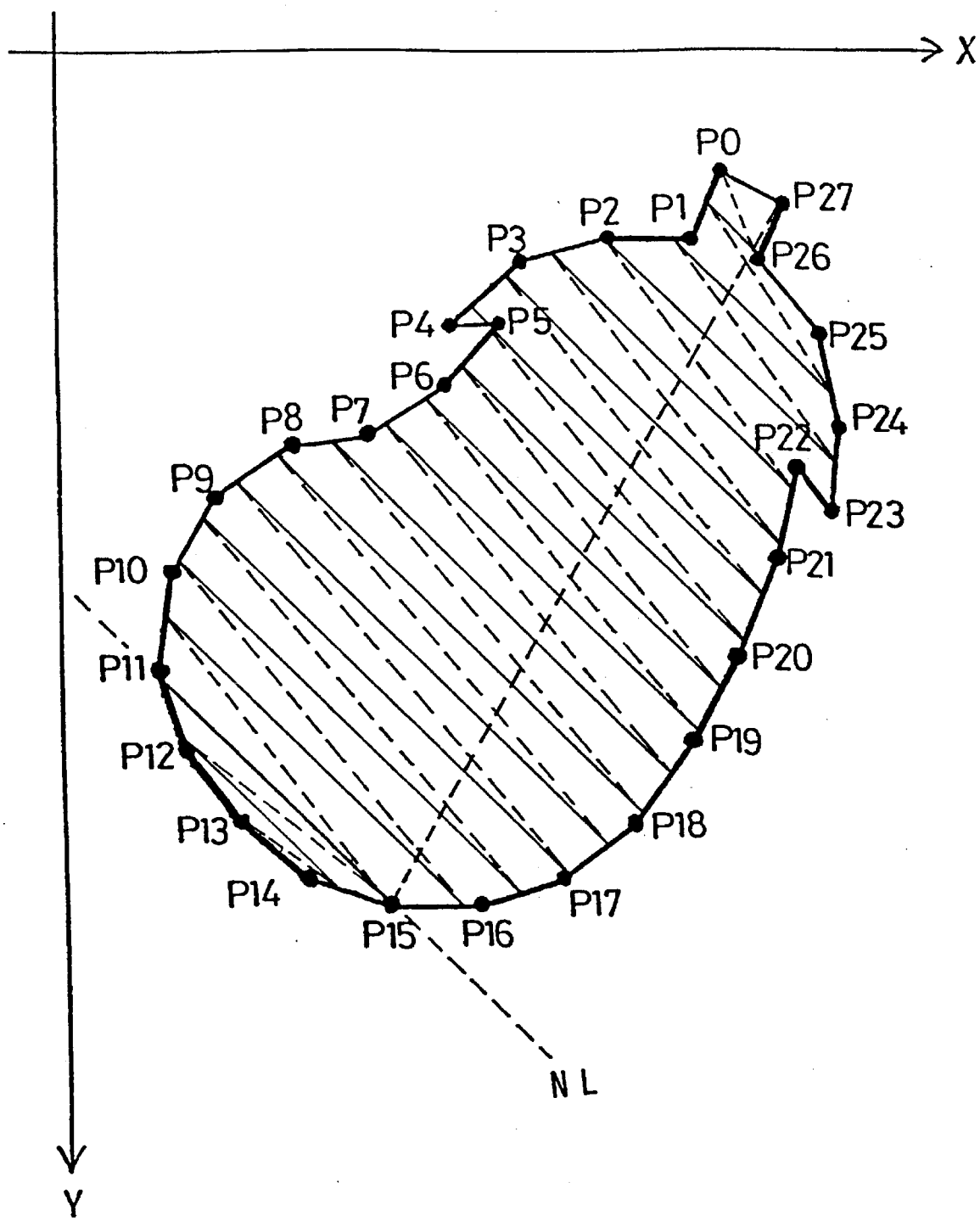
FIG. 8 is a representation of the embroidery stitches as applied to the closed region of FIG. 7.

Next, the system identifies the point most remote from the end point P15 on the opposite or, as shown in FIG. 8, the left side of line NL, that is, the point P14. Data is created for a running stitch from the end point P15 to the point P14, the point most remote from the line NL. Embroidery stitch data is then determined for the portion of the pattern lying to the left of line NL. The resultant stitch data produces a stitch having a stitching direction B, and an embroidery direction A, the slant of the stitches is the same as the stitching direction determined in steps S7 to S9. As portrayed in FIG. 8, representative understitches are shown with dashed lines and representative overstitches, that is the embroidery stitches themselves, are shown in solid lines.

In the described example of the embodiment, the stitches to be formed are those inclined counterclockwise at an angle of 45° to the boundary line EL, namely parallel to line NL, stitches of the stitching direction B, shown in FIG. 4. Since the embroidering direction in the actual partial embroidering region to the right of line NL is directed from the right to the left, the embroidery pattern is formed in a beautiful appearance. The embroidery data for the actual right partial embroidering region is created so that stitching is terminated at the end point P15.

However, the embroidery data for the left partial embroidering region on the left side of the line NL is also created so that stitching is terminated at the end point P15 specified in step S3.

Since the embroidering direction for the actual left partial embroidering region is directed from the left to the right, although slanted in the same direction as the stitches in the right partial embroidering region, the embroidered pattern in the left partial embroidering region does not have the quality of appearance of that of the right partial embroidering region. However, since the embroidering distance in the left partial embroidering region is smaller than that in the right partial embroidering region, the resulting embroidered pattern has a pleasing appearance in the whole closed region.

Obviously, if the pattern was such that line EL was positioned such that LX was greater than RX then the stitching direction would have been stitching direction A and line NL would have been established with the slant shown in FIG. 3. The system would then determine the remotest points from line NL to the left and to the right of line NL in order to create the embroidery stitches.

In step S11, the created embroidery data is stored in the flash memory card 10 to complete the embroidery data creating program.

The flash memory card 10, storing the created embroidery data, can then be loaded into an embroidery machine to enable the embroidery machine to embroider a workpiece. Since the stitching direction is determined by the operations in steps S4 to S9 so that most stitches covering the whole closed region are formed to have a beautiful appearance, even an operator having no knowledge of the characteristics of stitches is able to create embroidering data that will form an embroidered pattern having a beautiful appearance easily.

When embroidering adjacent partial embroidering regions by forming stitches in opposite embroidering directions respectively in the adjacent partial embroidering regions, the conventional embroidering data creating system determines suitable stitching directions respectively for the adjacent partial embroidering regions. Therefore, stitches having different stitching directions are formed contiguously in the vicinity of the boundary between the adjacent partial embroidering regions, so that a discontinuous pattern is formed in the vicinity of the boundary or the surface of a portion of the workpiece corresponding to the boundary is exposed. Because this embodiment embroiders the whole embroidering region with stitches having the same stitching direction, such a discontinuous pattern is not formed or a portion of the surface of the workpiece is not exposed in the vicinity of the boundary line.

As the embroidery data is created so that the start point and the end point coincide substantially with each other, the crossover thread extending from the start point and the crossover thread extending from the end point can be easily and simultaneously cut. Furthermore, in this embodiment, since the end point is selected at the lowest point within the embroidering region, that is, the end point is the lowest one of a plurality of points on the outline of the embroidering region, the last stitch is formed at an end of the embroidered pattern. Accordingly, the embroidered pattern can be formed with a beautiful appearance.

In the first embodiment, a stitching direction suitable for the embroidering direction for the partial embroidering region on one side of the boundary line passing through the end point and perpendicular to the embroidering directions and having the distance between the remotest point therein and the boundary line greater than that of the other partial region on the other side of the boundary line is determined. However, the stitching direction may be such that the stitching direction is suitable for the embroidering direction for the partial embroidering region having an embroidering area greater than that of the other. The result is the whole embroidered pattern looks beautiful when the greater embroidering area is embroidered to have a beautiful appearance.

An embroidery data creating system in a second embodiment according to the invention will be described hereinafter with reference to FIGS. 9A, 9B, 10 and 11. The second embodiment differs from the first and the second embodiment in that the second embodiment determines a stitching direction on the basis of the difference in embroidering area of initial partial embroidering regions on the opposite sides of a boundary line. In the following description, parts of the second embodiment that are like or correspond to those of the first embodiment are designated by the same reference characters and the description thereof will be omitted. Since the structure of the embroidery data creating system in the second embodiment is identical with those of the embroidery data creating systems in the first embodiment, a description of the structure will be omitted and only the operation will be described.

Figure 9A:
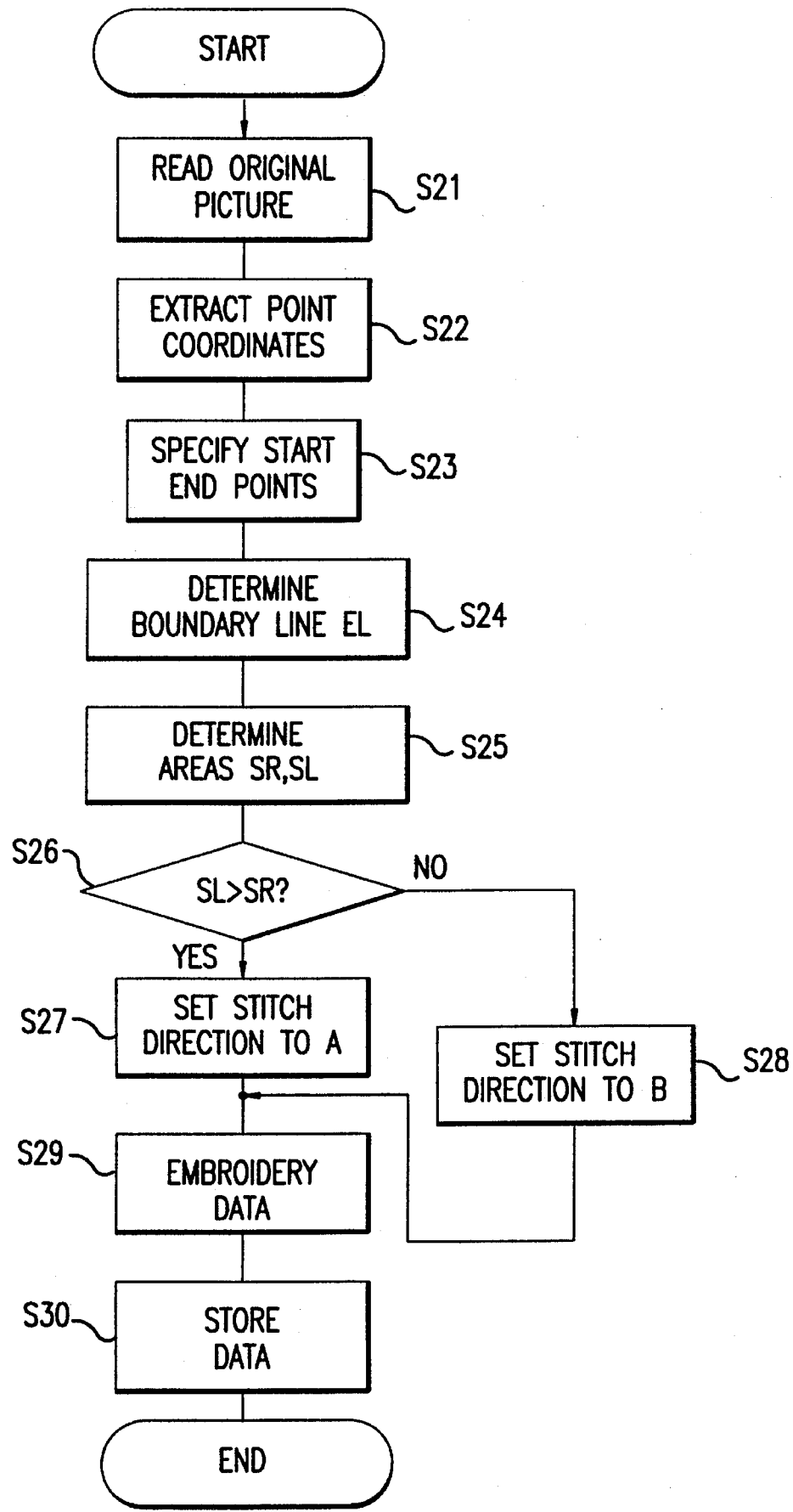
FIG. 9A is a flow chart, with summary labels, of an embroidery data creating procedure to be carried out by an embroidery data creating system in a second embodiment according to invention.
Figure 10:
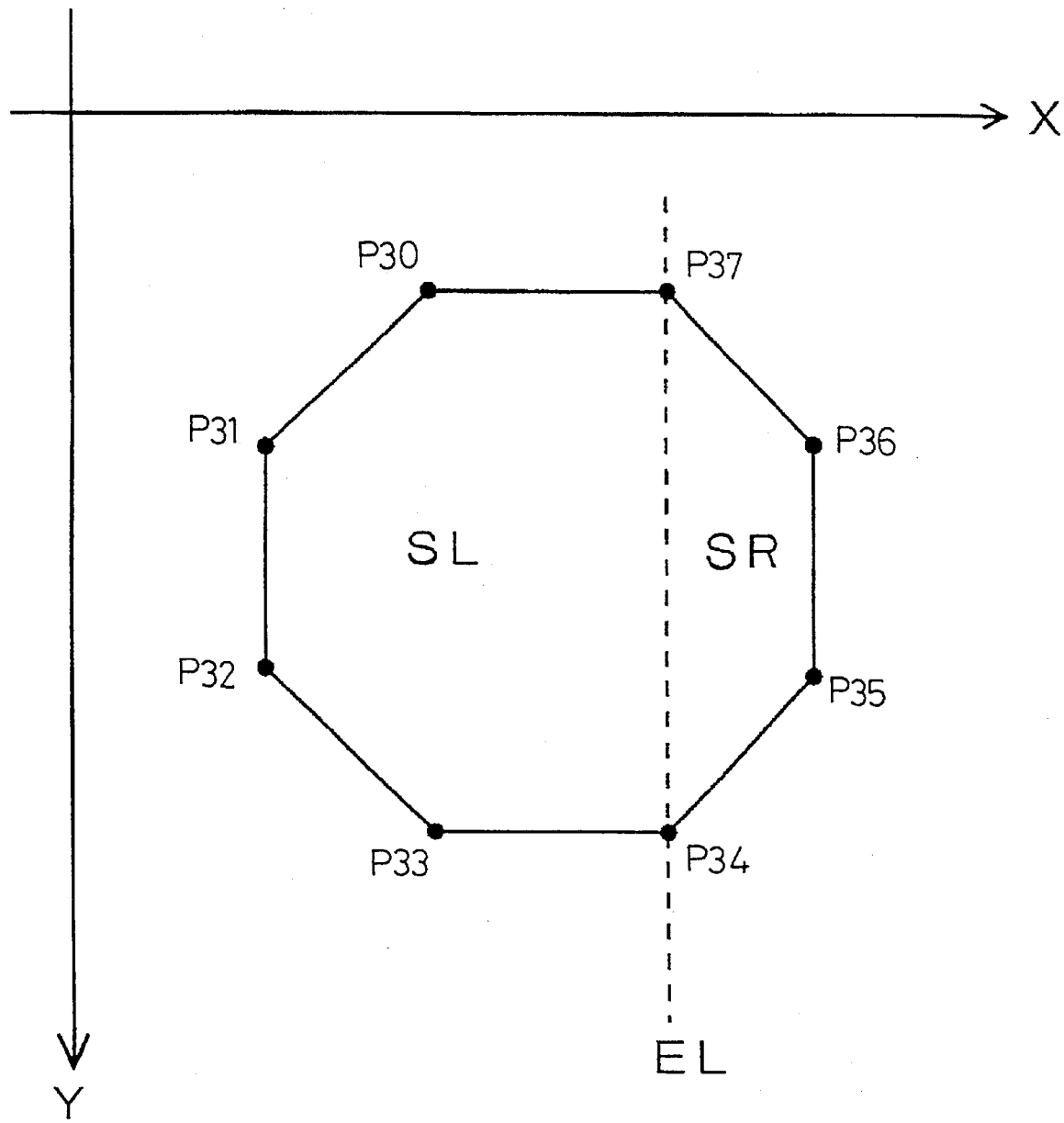
FIG. 10 is a graph showing the coordinates of points defining a closed region determined by the embroidery data creating system in the second embodiment.

The main unit 1 is connected to a power source and an embroidery data creating program stored in the ROM 3 is started to carry out an embroidery data creating procedure represented by a flow chart shown in FIGS. 9A and 9B. Then, in step S21, the operator operates the image scanner 12 to read an original picture, not shown, of a regular octagon having sides of a length n. The image data of the original picture thus obtained is stored in the RAM 4. In step S22, the respective coordinates of points that define the outline of a closed region are extracted; that is, the coordinates of points P30 to P37, shown in FIG. 10, are extracted as coordinate data defining the shape of the closed region to be embroidered.

In step S23, the point P34, for example, among the coordinate points is assigned as a start point and an end point according to the embroidery data creating program stored in the ROM 3. In step S24, a straight line passing through the point P34, i.e., the end point, and perpendicular to the x-axis is Used as a boundary line EL.

In step S25, the area SR of an initial right partial embroidering region on the right side of the boundary line EL and the area SL of an initial left partial embroidering region on the left side of the boundary line EL are determined. Because the closed area, shown in FIG. 10, has the shape of the regular octagon having sides of a length n, $$SR = n^2(\sqrt{2} + 1)/2$$
$$SL = 3n^2(\sqrt{2} + 1)/2.$$

Then, in step S26, the areas SR and SL are compared. If the area SL is greater than the area SR, a decision in step S26 is affirmative and step S27 is executed to select the stitching direction A, shown in FIG. 3, for stitches for embroidering the closed region. If the area SL is not greater than the area SR, a decision in step S26 is negative and step S28 is executed to select the stitching direction B, shown in FIG. 4, for stitches for embroidering the closed region. In this embodiment, since the area SL is greater than the area SR, as shown in FIG. 10, the decision in step S26 is affirmative, step S27 is executed to select the stitching direction A, shown in FIG. 3.

Thus, the stitching direction suitable for the embroidering direction for the initial partial embroidering region having the greater area is selected to embroider the closed region by the operations in steps S24 through S28. Therefore, the area of the initial partial embroidering region which is embroidered having a beautiful appearance is large and, consequently, the entire embroidered closed region looks beautiful. In FIG. 10, the boundary line EL is a straight line parallel to the y-axis.

Figure 11:
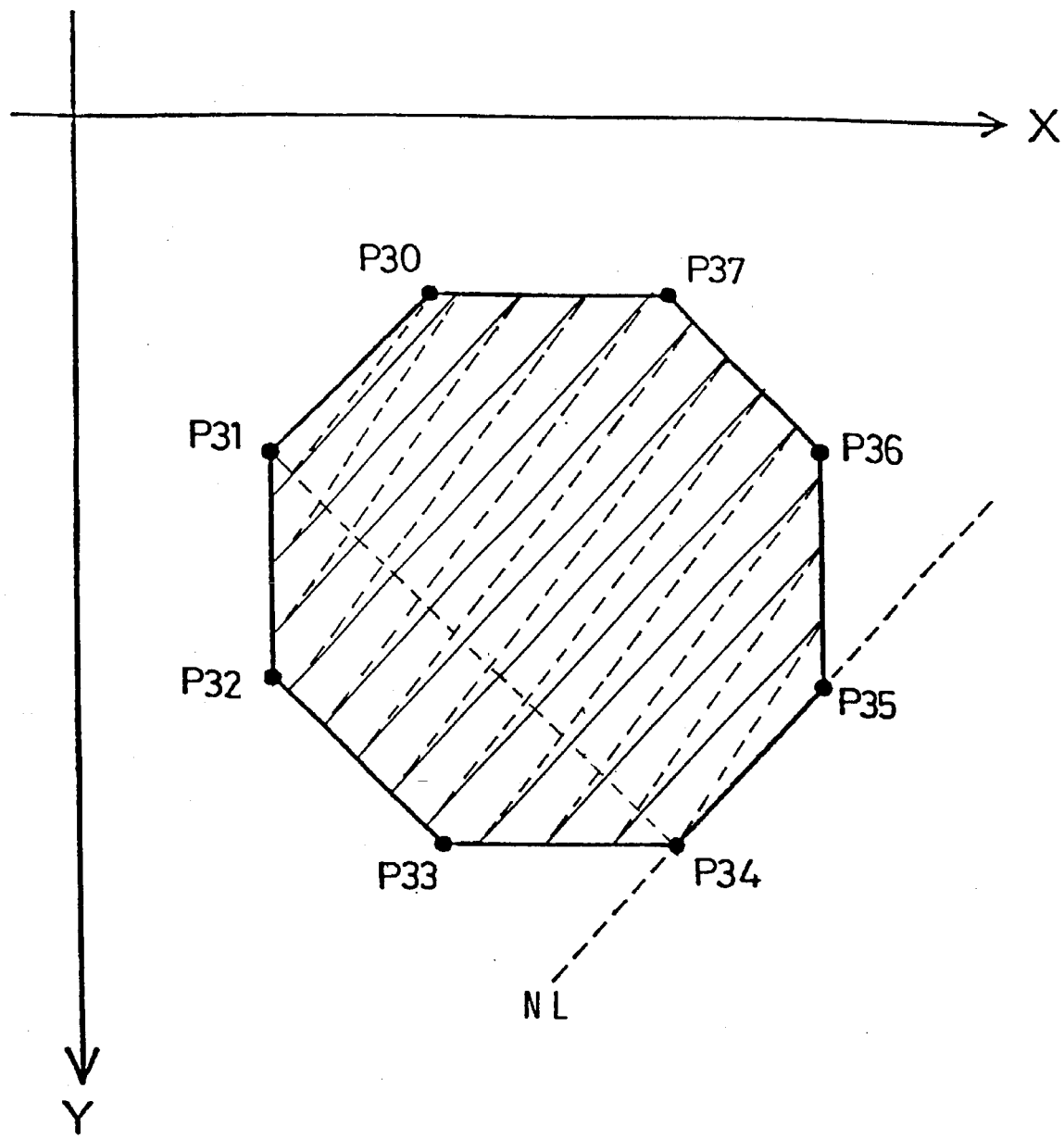
FIG. 11 is a representation of the embroidery stitches as applied to the closed region of FIG. 10 as determined by a second embodiment of the invention.

After the stitching direction has been determined, embroidery data is created in step S29. The first step in creating the embroidery data is to define a boundary line NL passing through the point P34 and having a slant appropriate to the desired embroidery angle and running in the embroidery direction, which in this case is embroidery direction A. The system then identifies the point in the actual left partial embroidering region that is furthest from boundary line NL. For the pattern of the example, as shown in FIG. 11, that is the point P31. Data for a running stitch to the point P31 is created and then embroidery data for the stitching direction A is created to end at the end point P34. Again, as described with respect to the first embodiment, the underlying stitches are shown in dotted lines and the embroidered stitches are represented in solid lines.

Upon completion of the creation of embroidery stitch data in the actual left partial embroidery region, data is created for the actual right partial embroidering region. To create the embroidery stitch data for the actual right partial embroidering region, the rightmost point remotest from the boundary line NL is identified and running stitch data for a running stitch from the point P34 to the remotest right point is created. Subsequently, embroidery stitch data is created between the remotest right point back to the end point P34. The stitch data will be stitched in embroidering direction B but will have a slant that is parallel to the stitches made in the actual left partial embroidering region.

In the example shown in FIGS. 10 and 11, there is no actual right partial embroidering region as boundary line NL passes through an edge boundary between the points P34 and P35 of the pattern to be embroidered. Thus, in the example, there is no embroidery data for an actual right partial embroidering region. However, should such have been formed, the embroidering would have been in embroidering direction B while the stitches would have the same slant as the stitching in the actual left partial embroidering region. Because the largest portion of the pattern has embroidery stitches with a pleasing appearance, the overall impression presented by the completed embroidered pattern is a pleasing appearance.

As discussed with respect to the first embodiment, if the end point were selected such that the initial right partial embroidering region was larger than the initial left partial embroidering region, then the stitching direction selected would have been stitching direction B and the process of creating embroidery stitches would have been to create stitches having the appearance shown in FIG. 4, that is stitches slanted transverse to those shown in FIG. 11.

The embroidery data thus created is stored in the flash memory card 10 in step S30 and the embroidery data creating program is ended.

Since the second embodiment selects the stitching direction suitable for the embroidering direction determined for the initial partial embroidering region having an area greater than that of the other, the greater part of the whole embroidering region can be embroidered with a beautiful appearance.

The invention is not limited in its application to the embodiments specifically described herein and many changes are possible therein without departing from the scope thereof.

For example, although the embodiments described herein specify the start point and the end point in steps S3 and S23 according to the program stored in the ROM 3, the operator may specify two points among those represented by the coordinates as the start point and the end point. Stitch data for each stitch obtained by developing the created embroidery may be stored instead of the embroidery data in the flash memory card 10. Furthermore, the image scanner 12 is not the only means for obtaining the image data; an image input device, such as a camera, a digitizer and a pointing device, such as a mouse, are possible image data obtaining means. Further, the embroidery data created by the system can be directly output to a sewing, or embroidering, machine for stitching of the pattern.

What is claimed is:

1. An embroidery data creating system for creating embroidery data necessary for controlling an embroidery machine for embroidering in one of two opposing embroidering directions during embroidering operations, said embroidery data creating system comprising:

embroidering region defining means for defining an embroidering region;

end point specifying means for specifying an end point where stitching is to be terminated in the embroidering region defined by said embroidering region defining means;

boundary line determining means for determining an initial boundary line passing through said end point specified by the end point specifying means and perpendicular to the embroidering direction;

partial embroidering region selecting means for selecting one of two partial embroidering regions, a partial embroidering region of the two partial embroidering regions respectively on each side of the boundary line determined by said boundary line determining means, the partial embroidering region selected having a point remotest from the boundary line at a distance from the boundary line greater than the distance between the boundary line and a remotest point of the other partial embroidering region;

stitching direction determining means for determining a stitching direction along which stitches are to be formed in the whole embroidering region, the stitching direction being suitable for the partial embroidering region selected by said embroidering region selecting means to form stitches in the embroidering direction; and embroidery data creating means for creating embroidery data for the whole embroidering region according to the stitching direction determined by said stitching direction determining means.

2. The embroidery data creating system according to claim 1, wherein said boundary line determining means divides the embroidering region into actual partial embroidering regions by determining an actual boundary line passing through the end point.

3. The embroidery data creating system according to claim 2, wherein said embroidery data creating means creates embroidery data for forming stitches in the same stitching direction and in the opposite embroidering directions respectively in the actual partial embroidering regions on the opposite sides of the actual boundary line.

4. The embroidery data creating system according to claim 1, further comprising start point specifying means for specifying a start point where stitching is to be started in the embroidery region, wherein the start point coincides substantially with the end point specified by said end point specifying means.

5. The embroidery data creating system according to claim 1, wherein said embroidery region defining means defines an outline of the embroidery region with a plurality of points and said end point specifying means specifies as the end point one of the plurality of points.

6. The embroidery data creating system according to claim 1, further comprising a detachable memory means for storing the embroidery data created by said embroidery data creating means.

7. The embroidery data creating system according to claim 6, wherein said detachable memory means is a flash memory.

8. The embroidery data creating system according to claim 1, wherein said embroidering region defining means comprises a scanning means for reading an original image.

9. The embroidery data creating system according to claim 1, further comprising an input port for inputting image data from an external device.

10. The embroidery data creating system according to claim 1, further comprising an output port for outputting the embroidery data created by said embroidery data creating means to an external device.

11. An embroidery data creating system for creating embroidery data necessary for controlling an embroidery machine for embroidering in one of two opposing embroidering directions during embroidering operations, said embroidery data creating system comprising:

embroidering region defining means for defining an embroidering region;

end point specifying means for specifying an end point where stitching is to be terminated in the embroidering region defined by said embroidering region defining means;

boundary line determining means for determining an initial boundary line passing through the end point specified by said end point specifying means and perpendicular to the embroidering direction;

area comparing means for comparing the respective areas of initial partial embroidering regions respectively on the opposite sides of the initial boundary line determined by said boundary line determining means and selecting the initial partial embroidering region having the largest area;

stitching direction determining means for determining a stitching direction along which stitches are to be formed in the whole embroidering region, the stitching direction being suitable for the initial partial embroidering region selected by said area comparing means to form stitches in the embroidery direction; and embroidery data creating means for creating embroidery data for the whole embroidering region according to the stitching direction determined by said stitching direction determining means.

12. The embroidery data creating system according to claim 11, wherein said boundary line determining means divides the embroidering region into actual partial embroidering regions by determining an actual boundary line passing through the end point.

13. The embroidery data creating system according to claim 12, wherein said embroidery data creating means creates embroidery data for forming stitches in the same stitching direction and in the opposite embroidering directions respectively in the actual partial embroidering regions on the opposite sides of the actual boundary line.

14. The embroidery data creating system according to claim 11, further comprising start point specifying means for specifying a start point where stitching is to be started in the embroidery region, wherein the start point coincides substantially with the end point specified by said end point specifying means.

15. The embroidery data creating system according to claim 11, further comprising a detachable memory means for storing the embroidery data created by said embroidery data creating means.

16. The embroidery data creating system according to claim 15, wherein said detachable memory means is a flash memory.

17. A method of creating embroidery data, comprising the steps of:

defining an outline for an image to be embroidered;

identifying an end stitching point on the outline;

creating an initial boundary line passing through the end stitching point, the initial boundary line perpendicular to an embroidery direction in which embroidering is carried out;

designating a principal initial partial embroidering region based on initial partial embroidering regions created on either side of said initial boundary line;

selecting a stitching direction based on the principal initial partial embroidering region;

establishing an actual boundary line having a slant appropriate to the selected stitching direction and passing through the end stitching point;

defining a principal actual partial embroidering region from actual partial embroidering regions on either side of the actual boundary line, the principal actual embroidering region containing at least the principal initial embroidering region; and forming stitching data commencing with the principal actual embroidering region.

18. The method according to claim 17, wherein the step of designating a principal initial partial embroidering region, comprises the steps of:

determining a point on the image outline on each side of the initial boundary line which is furthest from the initial boundary line;

comparing a distance from the initial boundary line for each of the determined furthest points;

selecting the distance which is greatest; and designating the initial partial embroidering region having the point most distant from the initial boundary line as the principal initial partial embroidering region.

19. The method according to claim 17, wherein the step of designating a principal initial partial embroidering region, comprises the steps of:

determining the initial partial embroidering region having the largest area; and designating the initial partial embroidering region having the largest area the principal initial partial embroidering region.

20. The method according to claim 17, wherein the step of forming stitching data comprises the steps of:

forming stitching data for the principal actual partial embroidering region commencing at a point on the image outline most remote from the end stitching point; and forming stitching data for the other actual partial embroidering region commencing at a point on the image outline most remote from the end stitching point, wherein the stitching direction is the same in both actual partial embroidering regions but the embroidering directions are opposite to one another.

* * * * *